US010239502B2

United States Patent
Leinung et al.

(10) Patent No.: US 10,239,502 B2
(45) Date of Patent: Mar. 26, 2019

(54) ELECTRIC PARKING BRAKE

(71) Applicant: KNORR-BREMSE Systeme fuer Nutzfahrzeuge GmbH, Munich (DE)

(72) Inventors: Andreas Leinung, Munich (DE); Karsten Schnittger, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/357,771

(22) Filed: Nov. 21, 2016

(65) Prior Publication Data

US 2017/0066420 A1 Mar. 9, 2017

Related U.S. Application Data

(63) Continuation of application No. PCT/EP2015/061186, filed on May 20, 2015.

(30) Foreign Application Priority Data

May 22, 2014 (DE) ........................ 10 2014 107 218

(51) Int. Cl.
*B60T 7/20* (2006.01)
*B60T 13/68* (2006.01)

(52) U.S. Cl.
CPC .............. *B60T 7/20* (2013.01); *B60T 13/683* (2013.01)

(58) Field of Classification Search
CPC ........ B60T 7/20; B60T 13/683; B60T 8/1708; B60T 11/108
See application file for complete search history.

(56) References Cited

U.S. PATENT DOCUMENTS

| 2010/0025141 A1 | 2/2010 | Bensch et al. |
| 2010/0187902 A1 | 7/2010 | Bensch et al. |

(Continued)

FOREIGN PATENT DOCUMENTS

| DE | 10 2008 007 877 B3 | 11/2009 |
| DE | 10 2008 048 207 B4 | 6/2011 |

(Continued)

OTHER PUBLICATIONS

International Search Report (PCT/ISA/210) issued in PCT Application No. PCT/EP2015/061186 dated Jul. 22, 2015 with English translation (five pages).

(Continued)

*Primary Examiner* — Melanie Torres Williams
(74) *Attorney, Agent, or Firm* — Crowell & Moring LLP (57) ABSTRACT

An electric parking brake, in particular for a commercial vehicle, has at least two compressed-air outputs, an electrically controllable valve arrangement for controlling a distribution of compressed air to the compressed-air outputs and including a bistable valve, and a compressed-air input which can be connected to a compressed-air supply for supplying compressed air from a compressor and/or from a compressed-air reservoir to the valve arrangement and to the compressed-air outputs. The electronic parking brake has as small a number of switchable valves as possible and reliably supplies compressed air to the compressed-air outputs. The bistable valve is supplied with compressed air at the input end by the compressed-air supply at least during a de-energized state of the valve arrangement. The compressed air is at a pressure which is made available by the compressor and/or the compressed-air reservoir.

9 Claims, 6 Drawing Sheets

(56) References Cited

U.S. PATENT DOCUMENTS

| | | | | |
|---|---|---|---|---|
| 2011/0012421 A1* | 1/2011 | Bensch | ................ | B60T 8/1708 |
| | | | | 303/115.2 |
| 2011/0147141 A1* | 6/2011 | Schnittger | ............. | B60T 13/662 |
| | | | | 188/152 |
| 2013/0015024 A1* | 1/2013 | Vuckovic | ............. | B60T 13/385 |
| | | | | 188/170 |

FOREIGN PATENT DOCUMENTS

| | | | |
|---|---|---|---|
| DE | 10 2011 114 071 A1 | 3/2013 | |
| DE | 10 2012 000 435 A1 | 7/2013 | |
| EP | 2 240 352 B1 | 10/2012 | |
| EP | 2 572 950 A2 | 3/2013 | |
| WO | WO 2007/065498 A1 | 6/2007 | |
| WO | WO 2008/101592 A2 | 8/2008 | |
| WO | WO 2009/098003 A2 | 8/2009 | |
| WO | WO-2009098003 A2 * | 8/2009 | ............ B60T 13/683 |

OTHER PUBLICATIONS

German-language Written Opinion (PCT/ISA/237) issued in PCT Application No. PCT/EP2015/061186 dated Jul. 22, 2015 (five pages).

German Office Action issued in counterpart German Application No. 10 2014 107 218.9 dated Mar. 4, 2015 (five pages).

International Preliminary Report on Patentability (PCT/IB/326, PCT/IB/338, and PCT/IB/373) issued in PCT Application No. PCT/EP2015/061186 dated Dec. 1, 2016 including English translation of document C2 (German-language Written Opinion (PCT/ISA/237)) previously filed on Nov. 21, 2016 (nine (9) pages).

\* cited by examiner

ELECTRIC PARKING BRAKE

CROSS REFERENCE TO RELATED APPLICATIONS

This application is a continuation of PCT International Application No. PCT/EP2015/061186, filed May 20, 2015, which claims priority under 35 U.S.C. § 119 from German Patent Application No. 10 2014 107 218.9, filed May 22, 2014, the entire disclosures of which are herein expressly incorporated by reference.

BACKGROUND AND SUMMARY OF THE INVENTION

The invention relates to an electric parking brake, in particular for a commercial vehicle, comprising at least two compressed-air outlets, an electrically controllable valve arrangement having a bistable valve for controlling a distribution of compressed air to the compressed-air outlets, and a compressed-air inlet which may be connected to a compressed-air supply for supplying the valve arrangement and the compressed-air outlets with compressed air from a compressor and/or a compressed-air reservoir.

Electric parking brakes are known, for example, from DE 10 2008 048 207 B4, wherein a compressor supplies the parking brake with compressed air and wherein a valve arrangement having electrically actuable valves and a relay valve regulates the compressed-air supply for consumer circuits, for example a trailer control valve or a spring-loaded emergency brake, which are connected to compressed-air outlets. The parking brake here has an electrically controllable valve which, in addition to pressures which correspond to a permanent open position or closed position of the valve, can also supply the consumer circuits with a gradual intermediate air pressure, for which the controllable valve is operated in a pulsed manner. The parking brake has, at the compressed-air outlet for the spring-loaded emergency brake, a relay valve to which compressed air from the compressed-air source is supplied on the inlet side and whereof the outlet pressure is controlled by the gradual pressure of the blocking valve applied to a control inlet.

DE 10 2008 007 877 B3 discloses a parking brake device having a spring brake cylinder arranged on the outlet side and trailer control valves arranged on the outlet side. The spring brake cylinder is controlled by a relay valve, wherein the relay valve is controlled by a safety valve which has a pneumatic feedback whereby a select low valve switches the lower of two pressures, which is applied at an outlet or at an inlet of the safety valve, through to a control inlet of the safety valve. The safety valve is supplied with regulated compressed air on the inlet side by way of two solenoid valves and, solely in terms of its construction, is a monostable valve wherein a bistability of the safety valve is achieved by the pneumatic feedback.

It shall be understood below that the parking brake is always viewed from the compressed-air supply to the compressed-air outlets. When reference is made to following components, this always means the components which, in terms of the circuit, are arranged closer to the compressed-air outlets in the lines or in the parking brake. The same applies to the words "inlet side" and "outlet side", wherein "inlet side" refers to the connection which faces the compressed-air supply and "outlet side" refers to the connection of a component which faces the compressed-air outlets. "On the control side" describes the association of a component with a control connection which may be present. It is furthermore understood that, in relation to a pressure level, the term "gradual" should be seen as being between a maximum reservoir pressure and a minimum ambient pressure. The term valve arrangement here is understood to mean an arrangement comprising all the valves and all the line elements located between the valves.

Currently used parking brakes with bistable valves enable stepped, i.e. gradual, braking only above a certain minimum pressure which is applied at the compressed-air outlets, since the emergency brake is automatically engaged below the minimum pressure, which is approximately 1 bar above ambient pressure. This is attributed to the switching behavior of a bistable valve used. In a parking position, bistable valves block the compressed-air supply to the electronic parking brake, whilst the electronic parking brake is connected to a vent line. This vents the parking brake and the spring mechanisms can apply a brake force. In a driving position, the compressed-air supply to the electric parking brake is connected so that the venting of the electronic parking brake is closed and the electronic parking brake releases or is released.

The object of the invention is to provide an electronic parking brake which has as few switchable valves as possible and which reliably supplies compressed air to the compressed-air outlets.

This object is achieved by an electronic parking brake in accordance with embodiments of the invention.

The invention builds on the generic electric parking brake in that the bistable valve is supplied with compressed air by the compressed-air supply on the inlet side irrespective of the switching status of the valve arrangement. The compressed air is at a pressure which is provided by the compressor and/or the compressed-air reservoir. It is thus possible to guarantee that the electric parking brake can always ensure a braking action of the trailer brake. On the other hand, should it be possible for the inlet pressure of the bistable valve to drop to ambient pressure, this could result in the trailer remaining unbraked during a braking procedure and consequently running into the towing vehicle. In the worst case, the towing vehicle/trailer unit can then jackknife. This risk is entirely eradicated by the invention. In particular, it is thus advantageously possible to realize a parking brake whereof the consumers connected downstream of the bistable valve are also reliably supplied with reservoir pressure in the event of a power failure when the bistable valve is switched to its open position. It is therefore advantageously possible to control a status of the compressed-air outlets, at least during travel, by means of the bistable valve alone, without any influence from components, in particular valves, which are connected upstream. By means of the electronic parking brake according to the invention, it is furthermore possible to implement the actuation of an emergency brake of the commercial vehicle and a test function known as a trailer test function. In this case, the braking action of the emergency brake and the service brake of the trailer can be advantageously gradually adjustable, wherein the test function can be executed without it being necessary to move out of a stable parking position. In the trailer test function, before the commercial vehicle is immobilized the driver tests whether a commercial vehicle/trailer unit can also be parked on an incline, even if only the parking brake of the commercial vehicle, and not a brake of the trailer, is activated. To this end, when the parking brake of the commercial vehicle is engaged, the brake of the trailer is released by supplying compressed air to the control line of a trailer control module. If the towing vehicle/trailer unit does not move, then the unit can be immobilized on the incline.

The parking brake according to the invention can have the feature of connecting the bistable valve directly to the compressed-air supply. The direct significance of this is that no active components, in particular no switchable valves, are arranged in a compressed-air line between the compressed-air supply and the bistable valve. It is thus advantageously achieved that the parking brake does not switch a component, for example a solenoid valve, arranged upstream of the bistable valve as a result of a sudden power failure and thereby inadvertently alter a status of the system as a whole.

The invention can advantageously be developed in such a way that the valve arrangement comprises precisely three electrically controllable valves. This is a very small number of controllable valves for supplying compressed air to two or three compressed-air outlets which can be acted upon by a different pressure in each case. The invention can provide for the three electrically controllable valves to comprise the bistable valve. It can furthermore be intended for the electrically controllable valves to be solenoid valves. It is moreover possible to opt for the special case in which the electrically controllable valves comprise at least one 3/2-way valve. In an advantageous development, the 3/2-way valve is connected to a vent line wherein it vents the following components to ambient pressure in a venting position. Provision can also be made for the electrically controllable valves to comprise a 2/2-way valve. Provision can be made for the electrically controllable valves to be preloaded in one of their switching positions. Provision can be additionally or alternatively made here for an electrically controllable valve to have a motor drive for changing the switching position. The invention can, in particular, be constructed in such a way that the bistable valve has a motor drive.

The invention can advantageously be constructed in such a way that the valve arrangement comprises a pneumatically controllable valve for inverting a reservoir pressure for a trailer control module. Inverting the pressure means that the pressure provided is purely a reservoir pressure instead of an ambient pressure, and vice versa. Provision can also be made for the pneumatically controllable valve to be connected to a vent line. The reservoir pressure itself corresponds to a maximum air pressure provided by the compressed-air supply. The invention can advantageously be constructed in such a way that the pneumatically controllable valve is controlled by at least one of the electrically controllable valves. Provision can furthermore be made for the pneumatically controllable valve to be controlled by the bistable valve. It is moreover possible for a select high valve or a select low valve to be connected upstream of the pneumatically controllable valve. This enables interconnections with the bistable valve to be achieved in simple and favorable manner. Provision can furthermore be made for the pneumatically controllable valve to be a 3/2-way valve, wherein the valve can assume an open switching position and a blocking position and wherein the vent line vents the following parking brake components in the blocking position. Provision can be made for the compressed air applied at the pneumatically controllable valve on the inlet side to come directly from the compressed-air supply. Provision can furthermore be made for the pneumatically controllable valve to vent the following components when the compressed air applied at the control side is higher than the ambient pressure. In particular, provision can be made for the pneumatically controllable valve to vent the following components if the pressure delivered by one of two electrically controllable valves on the control side is higher than the ambient pressure.

Provision is preferably made for the valve arrangement to have an electrically controllable valve pair, which provides a gradual compressed-air supply to the at least two compressed-air outlets. It is therefore advantageously possible to provide any pressure to control the trailer control module and the emergency brake cylinders. Provision can be made for the valve pair to consist of a 3/2-way valve and a 2/2-way valve. In this case, provision can be made in particular for the 3/2-way valve to be connected upstream of the 2/2-way valve. Provision can furthermore be made for the valve pair to be formed by two solenoid valves. The solenoid valves can therefore be advantageously controlled by an electrical control device so that a desired pressure can be advantageously provided at the compressed-air outlets. The invention can be developed in such a way that the valve pair comprises a vent line and enables a compressed-air supply and a venting of the compressed-air outlets.

An advantageous development of the invention can be designed in such a way that one of the at least two compressed-air outlets supplies an emergency-brake connection with compressed air, wherein a relay valve is connected upstream of this compressed-air outlet. Provision can be made for the relay valve to be controlled by the gradual compressed air of the valve pair.

Provision can moreover advantageously be made for at least one pressure sensor for measuring the pressure of the compressed air to be arranged between the valve arrangement and one of the compressed-air outlets. It is thus advantageously possible to provide a pressure signal for an electrical control device to enable a reaction to changes in pressure. In particular, the pressure signal of the compressed-air outlets can be taken into account when controlling the emergency brake cylinders or the trailer control module.

The invention can furthermore provide for at least one pressure sensor for measuring the pressure of the compressed air to be arranged within the valve arrangement. In this case, provision can be made in particular for the pressure sensor to be arranged upstream of the control inlet of the relay valve so that compressed air applied at the relay valve on the control side can deliver feedback relating to the status of the relay valve. However, provision can also be made for a pressure sensor to be arranged in a line section immediately after the bistable valve or immediately after the valve pair. It is thereby readily possible to determine the pressure applied at the compressed-air outlets. Provision can be made in particular for a pressure sensor to be arranged in a line section between the valve arrangement and the compressed-air supply. It would be alternatively or additionally possible to also arrange a pressure sensor at the working outlet of the relay valve.

The invention can be advantageously developed in such a way that the bistable valve has a motor drive, in particular a self-locking motor drive. It is thus possible to advantageously achieve a stable position of the bistable valve, even when the bistable valve is not supplied with current. Provision can be made for the bistable valve to have a slide mechanism which is movably mounted in a valve housing and is controlled by the motor drive, and in which a valve body is movably arranged.

Provision can alternatively be made for the bistable valve to be pneumatically actuable.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 6 show an embodiment of an electric parking brake 10 according to the invention, comprising a valve arrangement 20 which controls the distribution of compressed air of a compressed-air supply 51 to compressed-air consumer circuits 60. The electric parking brake 10 is in a testing position in FIG. 1, the function of which will be explained in more detail below. The valve arrangement 20 comprises a first solenoid valve 21 constructed as a 3/2-way valve, a second solenoid valve 22 constructed as a 2/2-way valve, a bistable valve 24, a pneumatically controllable valve 23 as well as select high valves 25, 26, 27, a select low valve 28 and a relay valve 29 with a pneumatic control connection 29a. Solenoid valves are distinguished by their electrically alterable switching positions. Bistable valves are reliably switched in both switching positions, i.e. a loss of electrical voltage for controlling the bistable valve does not have any effect on the switching status of the valve. The bistable valve 24 here is preloaded by an optional spring element 24d in order to support the motor drive 24e in a drive direction, i.e. in the event of a switching status change. The consumer circuits 60 are a first trailer control module 61 connected to a first pressure outlet 71, a second trailer control module 62 connected to a second pressure outlet 72 and a first and second spring brake cylinder 63, 64 connected to a third pressure outlet 73. The two trailer brake modules 61, 62 each have a coupling head 61a, 62a for a reservoir and a coupling head 61b, 62b for a trailer brake. The pressure signal for the trailer brake is inverted by the trailer control modules. If the corresponding inlet of the trailer control modules 61, 62 is acted upon by pressure by way of the compressed-air outlets 71, 72, then the coupling heads 61b, 62b are not pressurized. In the non-pressurized state of the compressed-air outlets 71, 72, the coupling heads 61b, 62b are pressurized so that the trailer is braked. The parking brake shown has two compressed-air outlets 71, 72 for trailer control modules 61, 62 in order to use these selectively. Whilst the trailer control module 61 is provided to park the immobilized vehicle with an unbraked trailer, the trailer control module 62 provides the option of immobilizing the vehicle with the trailer braked. The compressed-air supply 50 is effected by means of a compressor 51 which supplies the parking brake with compressed air, i.e. with air at a pressure which is greater than the ambient pressure.

The first valve 21, the pneumatically controllable valve 23 and the bistable valve 24 are directly connected to the compressed-air supply 50 in unregulated manner. There is furthermore a direct and unregulated compressed-air supply to an inlet-side connection of the relay valve 29, whereof the outlet connection provides compressed air with a gradual air pressure proportionally to a pressure applied at the control connection 29a for the following spring brake cylinders 63, 64.

The valves are interconnected in the embodiment as follows.

The first solenoid valve 21 is supplied with compressed air on the inlet side from the compressed air of the compressor 51 or the compressed-air supply 50. The first solenoid valve 21 has two switching positions 21a, 21b here, wherein a first switching position 21a enables venting by way of a vent line 21c of the components following the first valve 21, the first switching position 21a corresponds accordingly to a venting position. In the second switching position 21b, the first solenoid valve 21 is switched to open so that the following components can be ventilated with the compressed air of the compressor 51. The first solenoid valve 21 is connected to the compressed-air supply 50 by a compressed-air line 31. The first solenoid valve 21 is preloaded in the second switching position 21b by a spring element 21d. To switch the solenoid valve 21 to the first switching position 21a, a voltage is applied to an electrical control connection 21e so that a magnetic force exceeds the force of the spring element 21d and switches the solenoid valve 21. A second solenoid valve 22 is connected to the first solenoid valve 21 by way of a compressed-air line 34 and a first inlet connection of the first select high valve 25 is connected to the first solenoid valve 21 by way of a compressed-air line 39 which branches off from the compressed-air line 34.

The second solenoid valve 22 has two switching positions 22a, 22b, wherein the first switching position 22a corresponds to a blocking position and the second switching position 22b corresponds to an open position. The second solenoid valve 22 is preloaded by a spring element 22d and is switched to the second switching position 22b by the preload force. To switch the second solenoid valve 22 to the first switching position 22a, a voltage is applied to an electrical control connection 22e so that a magnetic force exceeds the force of the spring element 22d and switches the second solenoid valve 22.

The first select high valve 25 is connected to the bistable valve 24 at a second inlet connection by way of a compressed—air line 38, wherein the higher of the two pressures of the first solenoid valve 21 and the bistable valve 24 is transferred by the select high valve 25 to the control inlet 23e of the pneumatically controllable valve 23 by way of a line 40.

The pneumatically controllable valve 23 is connected directly to the compressed-air supply 50 by way of compressed-air lines 31, 32, 35 and has two switching positions 23a, 23b, wherein the first switching position 23a is a venting position of the following components by way of a vent line 23c, and the second switching position 23 is an open position for ventilating a first inlet connection of the second select high valve 26 by way of a compressed-air line 43. The pneumatically controllable valve 23 is preloaded by a spring element 23d so that the pneumatically controllable valve 23 moves into the venting position 23a when a reservoir pressure is applied at the control connection 23e. If reservoir pressure is not applied at the control connection 23e, the pneumatically controllable valve 23 moves into the open position 23b.

The bistable valve 24 likewise has two switching positions 24a, 24b, wherein the first switching position 24a is an open position whilst the second switching position 24b is a venting position, wherein the following components, namely the first select high valve 25 and a select low valve 28, are vented by way of a vent line 24c.

The select low valve 28 connected to the second solenoid valve 22 and the bistable valve 24 by way of the lines 41, 42 and 36 is in communication with following components, namely the second select high valve 26 and the third select high valve 27. The outlet of the select low valve 28 directs the lower of the two inlet pressures.

The second select high valve 26 is supplied with compressed air on the inlet side by the pneumatically controllable valve 23 and the select low valve 28 by way of the two compressed-air lines 43, 44, wherein the compressed air having the higher pressure is transferred to the second outlet line 72. The second trailer brake module 62 is connected to the outlet line 72.

The third select high valve 27 is supplied with compressed air on the inlet side in each case by the select low valve 28 and a pneumatic control line 90 by way of the compressed-air line 45, wherein the compressed air having the higher of the two pressures is conducted to the pneumatic control connection 29a of the relay valve 29 by way of the compressed-air line 46. Arranged in the compressed-air line 46, for example, is a pressure sensor 80 which measures the pressure in the pressure line 46 and converts the measured value into a voltage value; this can then be read out (not displayed) by a control unit.

In particular, the compressed-air outlets are supplied with compressed air independently of one another. The first compressed-air outlet 71 is supplied directly with compressed air by means of the first and second solenoid valve 21, 22. The second compressed-air outlet 72 can be supplied with compressed air independently of the first compressed-air outlet by means of the select low valve 26 or by means of the pneumatically actuable valve 23. In contrast, the third compressed-air outlet 73 is supplied with compressed air directly by the air supply and is controlled only by way of the relay valve. In particular, the three compressed-air outlets 71, 72, 73 can be supplied individually with compressed air having different pressures.

Figure 1:
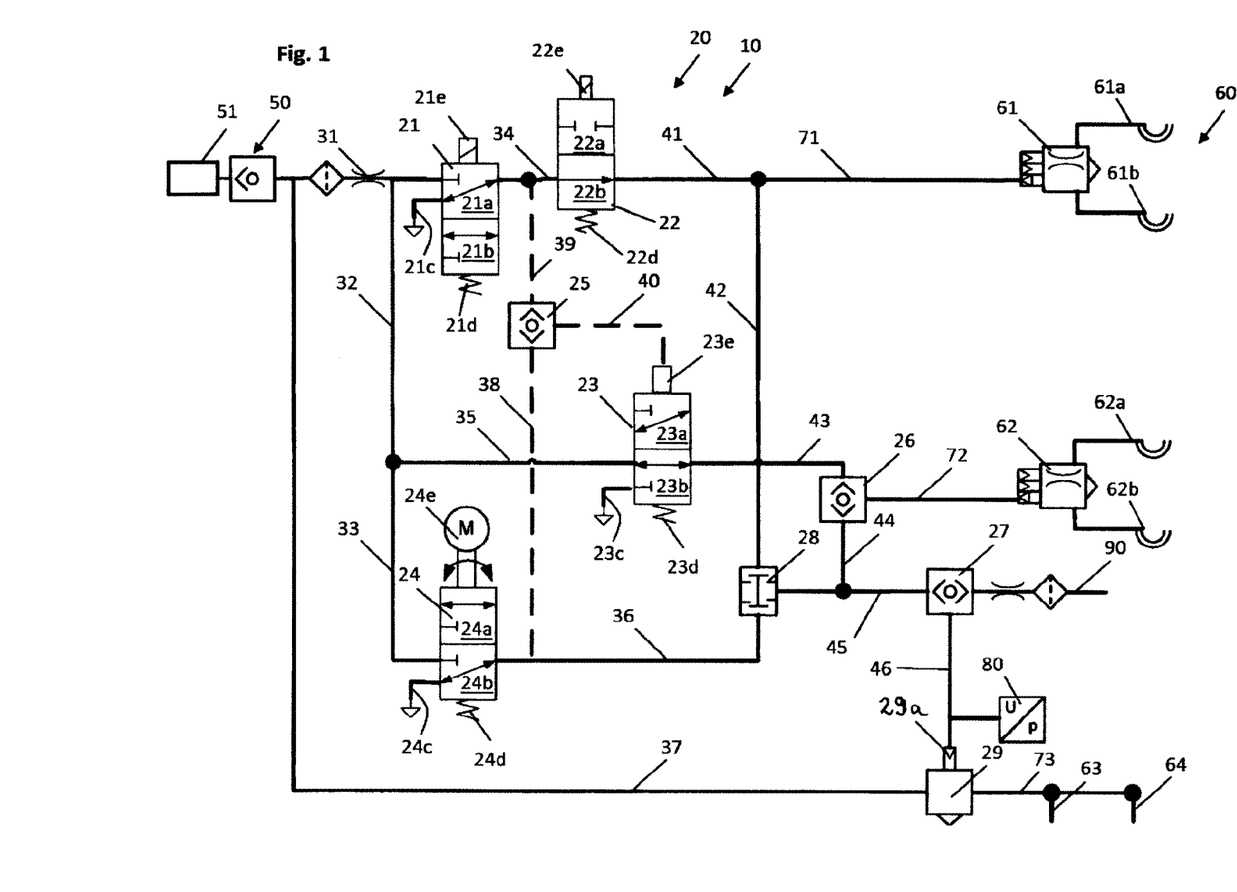
FIG. 1 is a schematic diagram of a testing configuration of an embodiment of an electric parking brake according to the invention.

In FIG. 1, the electric parking brake is shown in a testing configuration with reference to the trailer control module 62, wherein the first solenoid valve 21 and the bistable valve 24 are each switched to their venting position 21a, 24b so that the compressed air, which is at the reservoir pressure, is not conducted further, whilst the pneumatic control valve 23 actuated by these two valves 21, 24 is switched to the open position 23b by the spring element 23d as a result of the merely present ambient pressure at the control connection 23e. The second solenoid valve 22 is switched to open in the second switching position 22b here so that only ambient pressure is applied at the first trailer brake module 61 and at the select low valve 28 in each case. At the other inlet connection, the select low valve 28 is only supplied with ambient pressure by the bistable valve 24 so that the select low valve 28 only transfers ambient pressure to the second and the third select high valve 26, 27 in each case. Compressed air at the reservoir pressure of the compressor is therefore applied at the second select high valve 26, which is likewise supplied with compressed air by the pneumatically controllable valve 23, wherein the reservoir pressure is transferred to the second trailer brake module 62 as the higher of the two applied pressures. As a result of the pneumatically controllable valve 23, an inverting of the reservoir pressure takes place, wherein the inverting is effected in that, when reservoir pressure is transferred from the first solenoid valve 21 and/or the bistable valve 24, ambient pressure is provided to the following components by means of the pneumatically controllable valve 23. If the reservoir pressure is not transferred by any of the two valves comprising the first solenoid valve 21 and the bistable valve 24, the pneumatically controllable valve 23 conducts the reservoir pressure further. Likewise, in the testing configuration, only ambient pressure is applied at the pneumatic control line 90, so that likewise only ambient pressure is transferred to the relay valve 29 by means of the third select high valve 27. The relay valve 29 is thereby switched to a blocking or venting position and vents the third compressed-air outlet 73. This results in the spring brake cylinders 63, 64 also being vented so that the spring of the spring brake cylinders generates a braking force and the commercial vehicle is immobilized. Therefore only the parking brake of the commercial vehicle is active, and not the brake of the trailer, which means the trailer test can be carried out on a slope.

In particular, for this purpose, only the first solenoid valve 21 has to be moved in opposition to the preload force of the spring element 21d as a result of supplying a current to the electrical control connection 21e.

Figure 2:
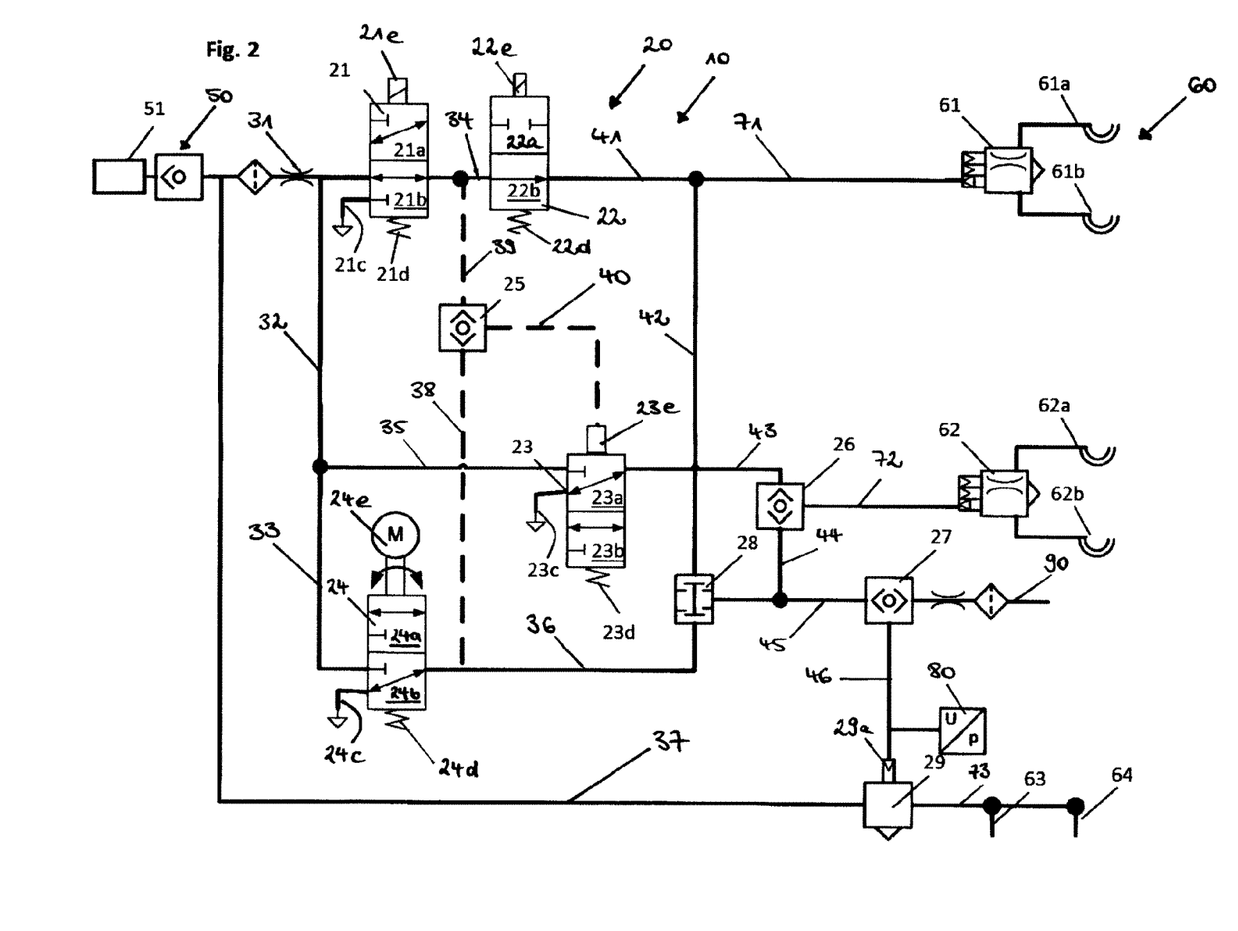
FIG. 2 is a schematic diagram of a parking configuration of an embodiment of an electric parking brake according to the invention.

FIG. 2 shows the embodiment of the parking brake 10 according to the invention in a parking configuration wherein, in contrast to the testing configuration, the first solenoid valve 21 is not supplied with current, which means that the first solenoid valve 21 is switched to the open position 21b as a result of the preload force of the spring element 21d. The pneumatically controllable valve 23, which is actuated by way of the select high valve 25, is therefore acted upon by the reservoir pressure of the compressor so that the pneumatically controllable valve 23 is moved in opposition to the preload force of the spring element 23 into the venting position. This results in the second select high valve 26 transferring the ambient pressure to the second outlet connection 72 and to the trailer brake module 62 connected to this outlet connection 72. The coupling head 62b is pressurized as a result of the inverting action of the trailer brake module 62. The trailer is braked. The electric parking brake is located in a stable position in the position shown in FIG. 2, since current does not need to be supplied to any of the components. Therefore, an electricity failure will advantageously not also lead to failure of the brake.

Figure 3:
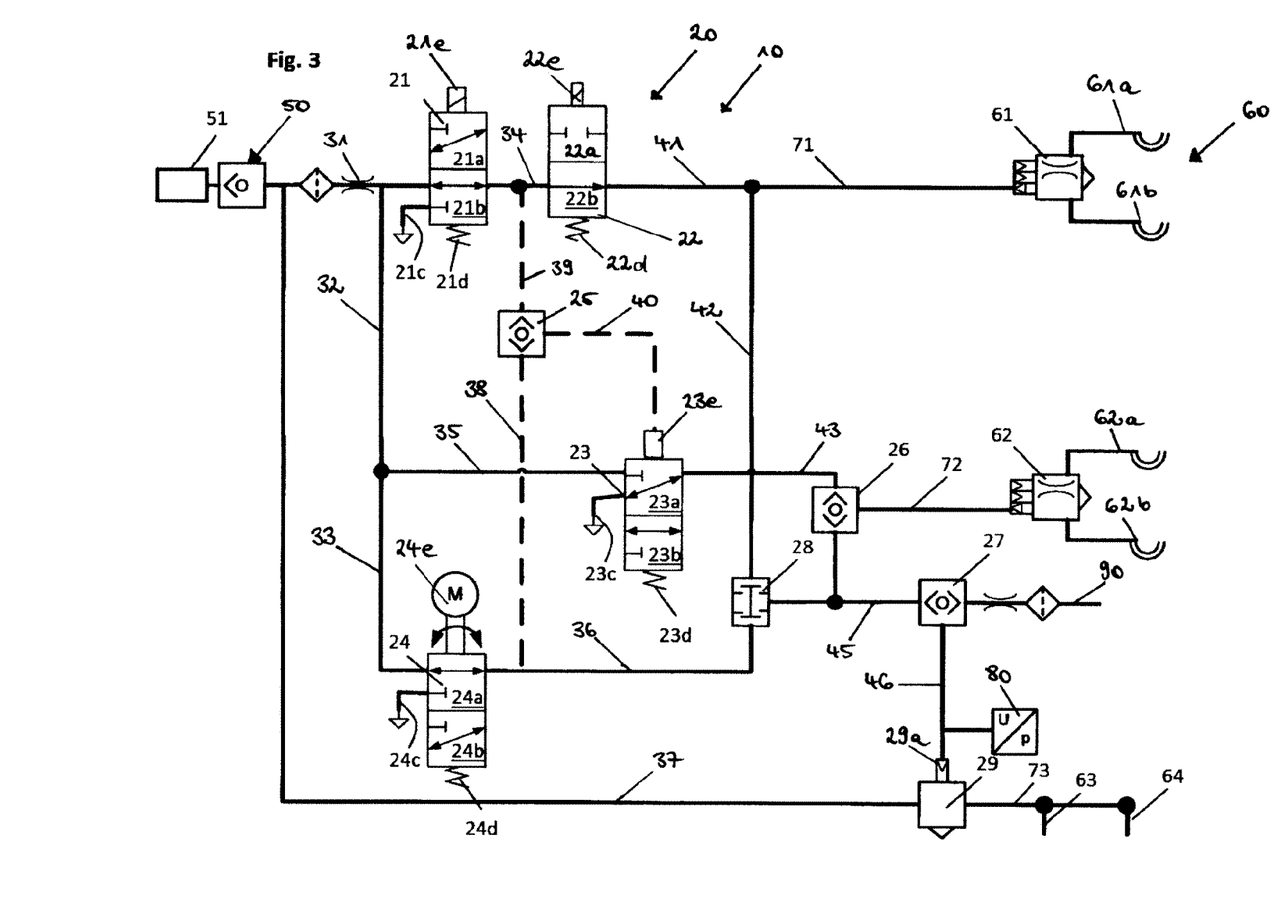
FIG. 3 is a schematic diagram of a driving configuration of an embodiment of an electric parking brake according to the invention.

FIG. 3 shows a driving configuration of the parking brake wherein, in contrast to the parking configuration, the bistable valve 24 is moved into the open position 24a by the motor drive 24e. The outlet-side compressed-air line 36, 38 to the select low valve 28 and to the first select high valve 26 is therefore acted upon by reservoir pressure, which causes a change in the pressure outlet signal of the select low valve 28 toward a high pressure. Compressed air at reservoir pressure is therefore applied at the second and the third select high valve in each case so that this reservoir pressure is transferred to the second trailer brake module 72 and the relay valve 29. This cancels the braking action of the trailer and causes the relay valve 29 to open so that the spring brake cylinders 63, 64 are supplied with compressed air at the third compressed-air outlet 73 and release in opposition to the spring force. Since the bistable valve 24 is stable in both positions and the solenoid valves 21, 22 are also not supplied with current, the parking brake is in turn in a stable position so that, even if the electricity fails, this position is maintained, which means that a suddenly occurring braking action does not sometimes take place.

Figure 4:
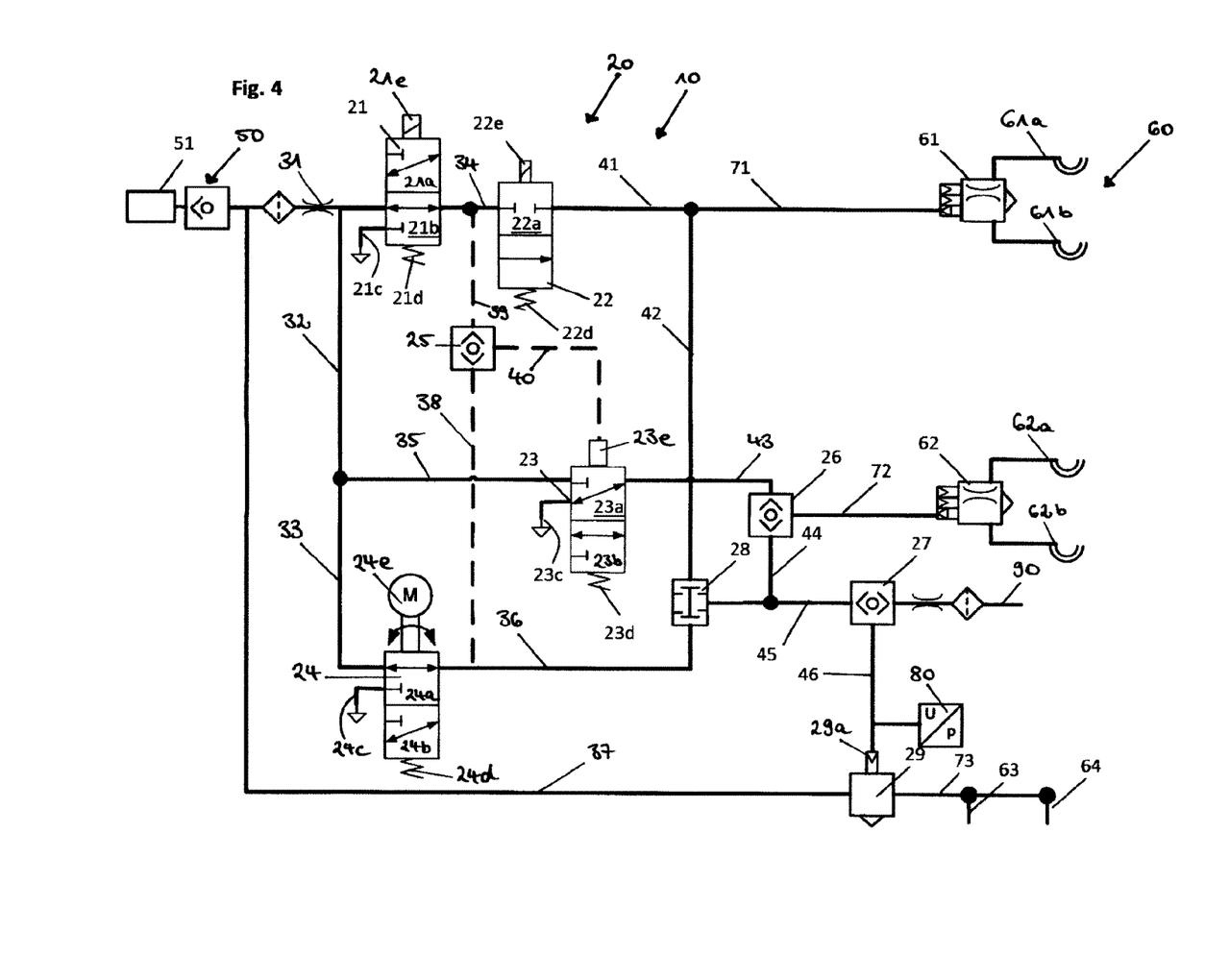
FIG. 4 is a schematic diagram of a holding configuration of an embodiment of an electric parking brake according to the invention.
Figure 5:
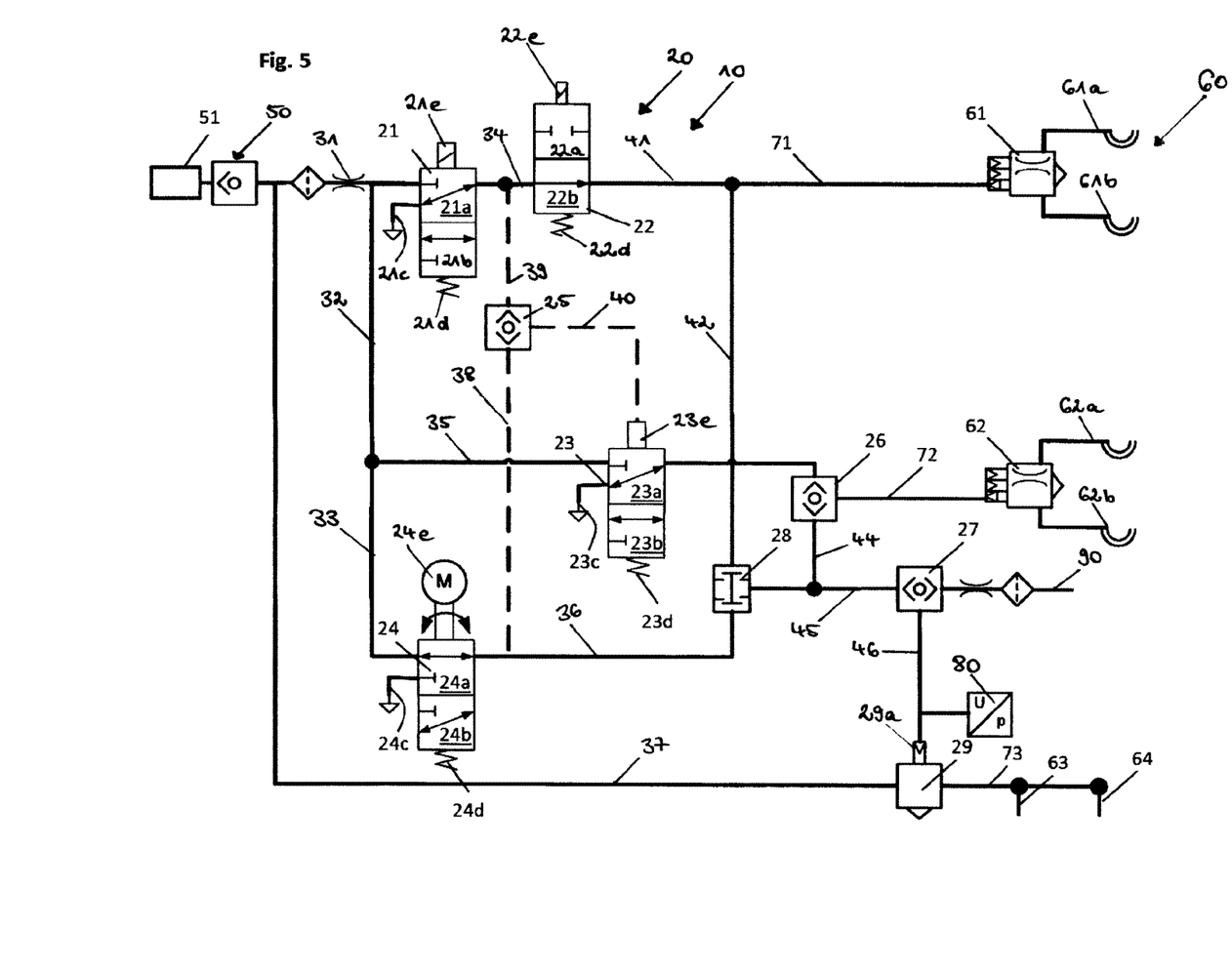
FIG. 5 is a schematic diagram of a venting configuration of an embodiment of an electric parking brake according to the invention.
Figure 6:
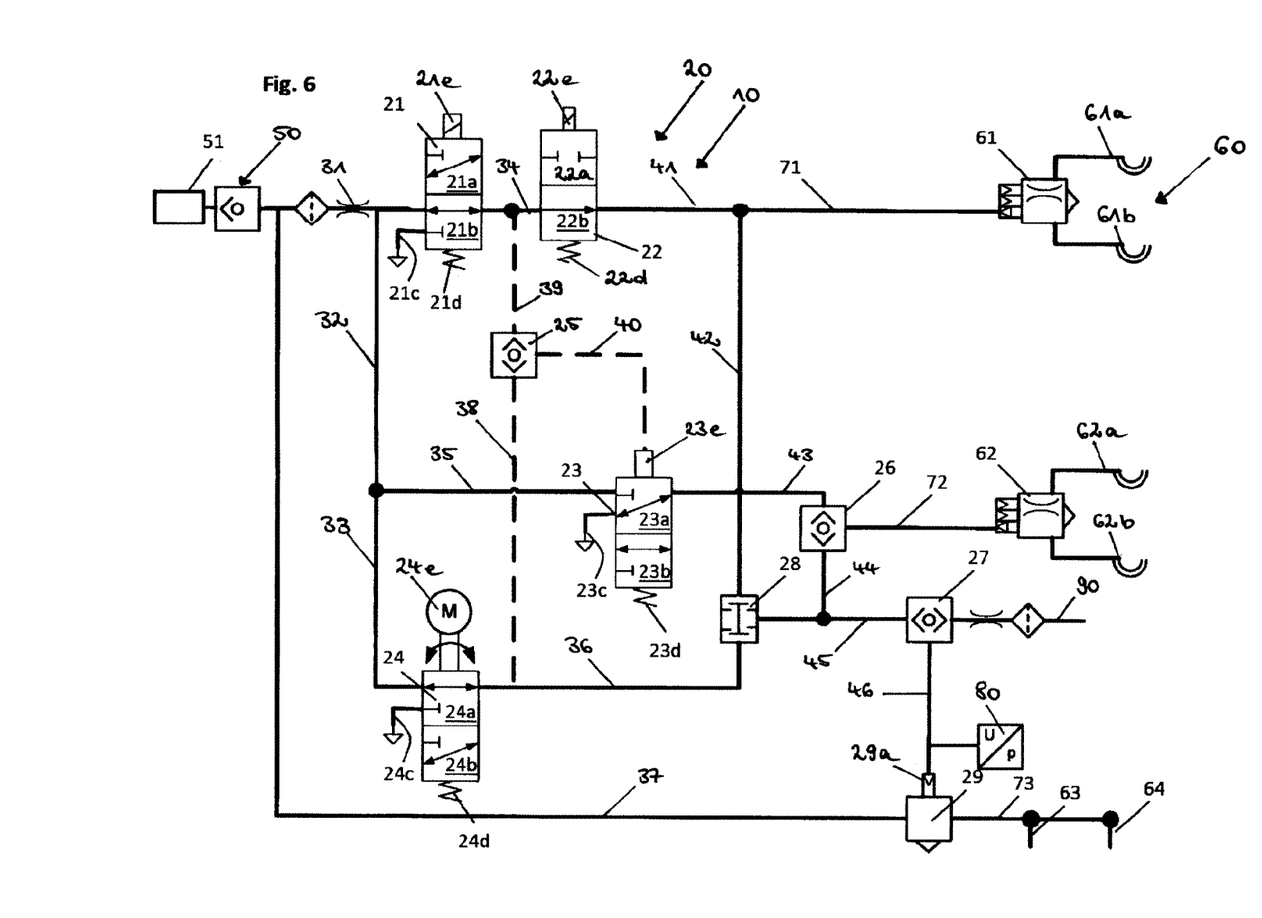
FIG. 6 is a schematic diagram of a ventilating configuration of an embodiment of an electric parking brake according to the invention.

Functions for the gradual ventilation or venting of the parking brake are described in FIGS. 4-6. These functions are used during travel to control a braking action of the trailer brake and to use a braking action of the spring brake cylinders 63, 64 as an auxiliary brake for a service brake. In particular, the two solenoid valves 21, 22 participate in the control of the gradual ventilation and venting of the compressed-air outlets since the bistable valve is switched to an open position so that the pneumatically controllable valve 23 is always actuated by reservoir pressure and thereby vents. The pressure signal of the bistable valve 24 is likewise not forwarded as a result of the select low valve 28, which means that the valve pair comprising the two electrically controllable solenoid valves 21, 22 has a significant influence on the pressure level at the compressed-air outlets 71, 72, 73.

In FIG. 4, the second solenoid valve 22 is supplied with current by way of the control connection 22e, wherein the second solenoid valve 22 is thereby displaced into a blocking position 22a in opposition to a preloading of the spring element 22d so that the pressure level of compressed air in the lines 41, 42, 44, 45, 46 is maintained as a result of the arrangement of the select low valve 28 downstream of the second solenoid valve 22 and the arrangement of the third select high valve 27 downstream of the select low valve 28. For venting not to take place, the first solenoid valve 21 and/or the bistable valve 24 have/has to be moved into an open position. The ventilation or venting of said lines is described with reference to FIGS. 5 and 6.

FIG. 5 shows a venting configuration in which the braking action is increased. Venting takes place gradually here. To this end, a corresponding power supply causes the first solenoid valve 21 and the second solenoid valve 22 to be switched to the other switching position from that of the holding configuration according to FIG. 4 in each case, so that the first solenoid valve 21 is switched to the venting position 21a and the second solenoid valve 22 is switched to an open position 22b. All of the following compressed-air lines and components are thus vented by the first solenoid valve 21 by way of the venting line 21c. This applies to the second solenoid valve 22, the select low valve 28, the second and third select high valve 26, 27 and the relay valve 29. The three compressed-air outlets 71, 72, 73 are thereby also vented. Venting does not take place immediately, but gradually, so that, by switching the first and second solenoid valve 21, 22 over to the holding configuration according to FIG. 4, a certain pressure level can be maintained in the abovementioned outputs and components. Owing to the inverting action of the trailer control module, the braking action in the trailer increases as a result of the increasing venting of the inlet connection.

A comparison between the configurations of FIGS. 1 and 5 illustrates the function of the bistable valve 24. The switching of the two solenoid valves 21 and 22 here is the same in both configurations. Whilst, in the testing configuration according to FIG. 1, the bistable valve 24 is moved into the venting position, and therefore the pneumatically controllable valve 23 transfers the reservoir pressure which is then forwarded to the second trailer control module 62 by way of the second select high valve 26 so that a maximum braking action takes place there, the bistable valve 24 in the venting configuration according to FIG. 5 is, on the other hand, switched to open, whereby the pneumatically controllable valve 23 is always actuated by a reservoir pressure. The lower of the two pressures applied at the select low valve 28, which is the falling pressure caused by the venting of the solenoid valves 21, 22, is therefore transferred to the trailer control module 62. Since reservoir pressure is present directly on the bistable valve 24, the situation cannot arise in which there is a breakdown of the pressure transferred from the bistable valve 24 to the first select high valve 25, which would result in a switchover of the pneumatically controllable valve 23. The second select high valve 26 would consequently be acted upon by reservoir pressure, and therefore also the inverting inlet of the trailer control module 62. The consequence of this would be that the braking action of the trailer would be canceled, which must be avoided during braking.

FIG. 6 shows a ventilating configuration in which the braking action decreases. To increase the pressure applied at the compressed-air outlets 71, 72, 73, the first solenoid valve 21 has to be switched to the open position 21b. At the same time, the second solenoid valve 22 also has to be switched to the open position 22b. As a result, compressed air at reservoir pressure is transferred from the compressed-air supply 50 to the outlet lines 71, 72, 73, wherein the pressure level at the third outlet 73 is controlled by way of the relay valve 29 and the pressure level applied thereto, but the actual compressed air on the inlet side of the relay valve 29 is provided directly by the compressed-air supply 50 so that the pressure level at the outlet line 73 can differ from that at the first compressed-air outlet 71 and the second pressure outlet 72. If the pressure level at the compressed-air outlets 71, 72, 73 is to be maintained, it is simply necessary for the second solenoid valve 22 to be switched from the open position 22b to the blocking position 22a.

It goes without saying that a pressure sensor for pressure measurement can be arranged at each of the compressed-air lines 31-46 and at the working outlet of the relay valve 29 or at the third compressed-air outlet or in the third outlet line 73.

LIST OF REFERENCE SIGNS 10 electric parking brake
20 valve arrangement
21 first solenoid valve, 3/2-way valve
21a first switching position, blocking position and venting
21b second switching position, open
21c vent line
21d spring element
21e electrical control connection
22 second solenoid valve, 2/2-way valve
22a first switching position, blocking position
22b second switching position, open
22d spring element
22e electrical control connection
23 pneumatically controllable valve, 3/2-way valve
23a first switching position, blocking position and venting
23b second switching position, open
23c vent line
23d spring element
23e pneumatic control connection
24 bistable valve, 3/2-way valve
24a first switching position, open
24b second switching position, blocking position and venting
24c vent line
24d spring element 24e motor drive
25 first select high valve
26 second select high valve
27 third select high valve
28 select low valve
29 relay valve
29a pneumatic control connection
31-46 compressed-air line
50 compressed-air supply
51 compressor
60 compressed-air consumer circuits
61 first trailer brake module
61a coupling head, reservoir of the first trailer module
61b coupling head, trailer brake
62 second trailer brake module
62a coupling head, trailer reservoir
62b coupling head, trailer brake
63 first spring brake cylinder
64 second spring brake cylinder
71 first compressed-air outlet
72 second compressed-air outlet
73 third compressed-air outlet
80 pressure sensor
90 pneumatic control line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric parking brake, comprising:
    at least two compressed-air outlets;
    an electrically controllable valve arrangement for controlling a distribution of compressed air to the compressed-air outlets, the valve arrangement including a bistable valve, a first solenoid valve, a second solenoid valve, a third valve, and a first select high valve;
    a compressed-air inlet which is connectable to a compressed-air supply for supplying the valve arrangement and the compressed-air outlets with compressed air from a compressor and/or a compressed-air reservoir;
    wherein
        the bistable valve is supplied with compressed air by the compressed-air supply on the inlet side irrespective of the switching status of the valve arrangement, said compressed air being at a pressure which is provided by the compressor and/or the compressed-air supply,
        the first solenoid valve is supplied with compressed air by the compressed-air supply on the inlet side,
        the second solenoid valve is between the first solenoid valve and at least one of the at least two compressed-air outlets,
        the third valve is arranged to control of supply of compressed air to at least one of the two compressed-air outlets,
        a first inlet of the first select high valve is connected to an outlet of the bi-stable valve and a second inlet of the first select high valve is connected to a line between the first solenoid valve and the second solenoid valve,
        an outlet of the first select high valve is connected to a control inlet of the third valve,
        one of the at least two compressed-air outlets supplies an emergency-brake connection with compressed air, wherein a relay valve is connected upstream of the one compressed-air outlet, and
        at least one pressure sensor for measuring the pressure of the compressed air is arranged within the valve arrangement.

2. The electric parking brake as claimed in claim 1, wherein the bistable valve is connected directly to the compressed-air supply.

3. The electric parking brake as claimed in claim 1, wherein the valve arrangement has an electrically controllable valve pair which provides a gradual compressed-air supply to the at least two compressed-air outlets.

4. The electric parking brake as claimed in claim 1, wherein at least one pressure sensor for measuring the pressure of the compressed air is arranged between the valve arrangement and one of the compressed-air outlets.

5. The electric parking brake as claimed in claim 1, wherein the bistable valve has a self-locking motor drive.

6. The electric parking brake as claimed in claim 1, wherein the bistable valve is pneumatically actuable.

7. The electrical parking brake as claimed in claim 1, wherein the brake is a commercial vehicle electric parking brake.

8. The electrical parking brake as claimed in claim 6, wherein the brake is a commercial vehicle electric parking brake.

9. An electric parking brake, comprising:
    at least two compressed-air outlets;
    an electrically controllable valve arrangement for controlling a distribution of compressed air to the compressed-air outlets, the valve arrangement including a bistable valve;
    a compressed-air inlet which is connectable to a compressed-air supply for supplying the valve arrangement and the compressed-air outlets with compressed air from a compressor and/or a compressed-air reservoir;
    wherein
        the bistable valve is supplied with compressed air by the compressed-air supply on the inlet side irrespective of the switching status of the valve arrangement, said compressed air being at a pressure which is provided by the compressor and/or the compressed-air supply,
        the valve arrangement comprises precisely three electrically controllable valves,
        the valve arrangement comprises a pneumatically controllable valve for inverting a reservoir pressure for a trailer control module, and
        the pneumatically controllable valve is controlled by the bistable valve.

* * * * *